(12) United States Patent
Shevchuk (10) Patent No.: US 6,325,549 B1
(45) Date of Patent: Dec. 4, 2001

(54) CONNECTORS FOR PLASTIC OPTICAL FIBER

(75) Inventor: George John Shevchuk, Middlesex, NJ (US)

(73) Assignee: Lucent Technologies Inc, Murray Hill, NJ (US)

(*) Notice: Subject to any disclaimer, the term of this patent is extended or adjusted under 35 U.S.C. 154(b) by 0 days.

(21) Appl. No.: 09/421,737

(22) Filed: Oct. 20, 1999

Related U.S. Application Data (60) Provisional application No. 60/143,590, filed on Jul. 13, 1999.

(51) Int. Cl.[7] ............................................ G02B 6/36
(52) U.S. Cl. ............................. 385/86; 385/76; 385/87
(58) Field of Search ................................. 388/55, 76, 86, 388/87

(56) References Cited

U.S. PATENT DOCUMENTS

| | | | |
|---|---|---|---|
| 4,838,641 | * | 6/1989 | Morimoto et al. ...................... 385/87 |
| 5,499,310 | * | 3/1996 | Ueda ....................................... 385/86 |
| 5,712,939 | | 1/1998 | Shahid .................................... 385/78 |

FOREIGN PATENT DOCUMENTS

| | | |
|---|---|---|
| 0 177 937 | 4/1986 | (EP) . |
| 0 517 346 | 12/1992 | (EP) . |
| 0 869 378 | 2/1997 | (EP) . |

\* cited by examiner

*Primary Examiner*—Darren Schuberg (57) ABSTRACT

A connector for an optical fiber includes a fiber holder for positionally aligning and retaining the end of the optical fiber and a clamp for selectively clamping the optical fiber against movement in and relative to the connector. The connector is insertable into a coupler for optically coupling the optical fiber with another optical fiber held in the connector or with an optical device.

23 Claims, 9 Drawing Sheets

CONNECTORS FOR PLASTIC OPTICAL FIBER

RELATED APPLICATIONS

This application claims priority from provisional application Serial No. 60/143,590 filed on Jul. 13, 1999.

BACKGROUND OF THE INVENTION

1. Field of the Invention

The present invention relates to connectors for interconnecting optical fibers to each other and to other optical components.

2. Description of the Related Art

Optical fiber communication systems are increasingly being used to transport data in the form of light pulses over long distances because they exhibit a very large capacity for carrying information, are light-weight, and are immune to electromagnetic interference. Important components of any optical fiber communication system are connectors for the optical fibers. These connectors may function as splices for connecting the ends of two optical fibers, or may be used to connect an optical fiber to other optical components.

It is important for the connector to properly align the optical fiber so that the insertion losses are minimized at the point at which the optical fiber is coupled to another optical fiber or to an optical component.

Optical fibers are usually formed of a thin glass or plastic fiber. Accordingly, the connector must also protect the end of the thin fiber from physical damage. In addition, the connector itself must not damage the end of the fiber during the connection or disconnection process.

Prior art connectors typically use a ferrule in which the end of an optical fiber is cemented in place to protect the end of the fiber from physical damage. The ferrule containing the end of the optical fiber is then aligned via insertion of the ferrule into a socket or plug. Because the end of the optical fiber is cemented in the ferrule, the fiber is held at an exact aligned location in the ferrule and the end of the fiber is physically protected.

A typical prior art connector device is disclosed in U.S. Pat. No. 5,768,455 (Konik). This prior art device includes a ferrule 12 for holding a length of bare fiber. The ferrule itself is held in a plug frame 13 (see FIG. 2).

Another prior art connector is shown in U.S. Pat. No. 5,638,474 (Lampert et al.). This prior art connector also employs a ferrule 140 which is held within a base member 150. The ferrule 140 receives the buffered fiber 33 which does not include the outer jacket 31 or strengthening members 32 that are placed over the buffered fiber.

More than one optical fiber may be inserted into a ferrule as shown in the prior art connector of U.S. Pat. No. 5,712,939 (Shahid) and U.S. Pat. No. 5,862,281 (Shahid), in which the fibers are held in place by a mold and the mold is filled with a material that encapsulates the fibers and forms a plug. The encapsulation of the end portions of the fibers is similar to the cementing of the above prior art devices in ferrules. Another prior art connector for holding multiple optical fibers is shown in U.S. Pat. No. 5,625,733 which has a cylindrical ferrule 100, 101 (see FIGS. 1 and 2); this particular connector is specifically designed for connecting optical fibers to optical devices.

The prior art connectors thus far described permanently connect the end of an optical fiber within a ferrule or plug. The Volition fiber optic cable systems manufactured by 3M, on the other hand, comprise plug and socket assemblies for connecting the ends of optical fibers. In the 3M systems the end of the optical fiber is free within the plug and is only held in the plug a preset distance from the end of the fiber. Within the socket, the free end of the plug-carried optical fiber is guided along a V-groove until it abuts the end of the socket-carried optical fiber. The plug and socket are designed so that there is a force urging the optical fibers into abutment when the plug is fully inserted into the socket. A specific type of glass optical fiber is used in this system. In addition, the Volition systems require the use of factory-assembled patch cords.

Accordingly, a significant problem and drawback of these prior art devices is that it is difficult, and in some cases impossible, to field mount the connectors to an optical fiber.

SUMMARY OF THE INVENTION

The present invention provides a connector for connecting an end of a first optical fiber to either another optical fiber or an optical device. The connector herein described is specifically designed for a plastic optical fiber (POF) having an outer diameter of 0.5 mm; however, the inventive connector can be used with any optical fiber that exhibits similar robustness. The connector includes a fiber holder portion, such as a sleeve, which receives the bare POF. The sleeve may also comprise a larger diameter portion which receives a fiber jacket. To terminate the POF, a portion of the fiber jacket is removed from the end of the POF to be terminated, and the bare end of the POF is inserted in the sleeve. A fiber clamp is then used to retain the optical fiber in the connector. The connector also includes a positioning guide comprising radial extending members which extend radially inward from a radially inner wall of the connector such that the radial inner ends of the positioning grips retain the optical fiber in a central position in the connector. The positioning guide may also extend at an angle to and toward the insertion direction. This configuration facilitates installation and provides enhanced prevention of unintended removal of the POF.

The connector may be designed so that the connector embodies a standard type of connector such as an LC-style connector or an RJ-45 connector or any other known or applicable form of connector.

The connector may additionally be configured with a half sleeve having a longitudinal V-groove so that two such connectors may be used to interconnect the ends of two POFs. In this embodiment, the connectors are arranged so that the V-groove of each opposes the other to retain the POFs in place.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
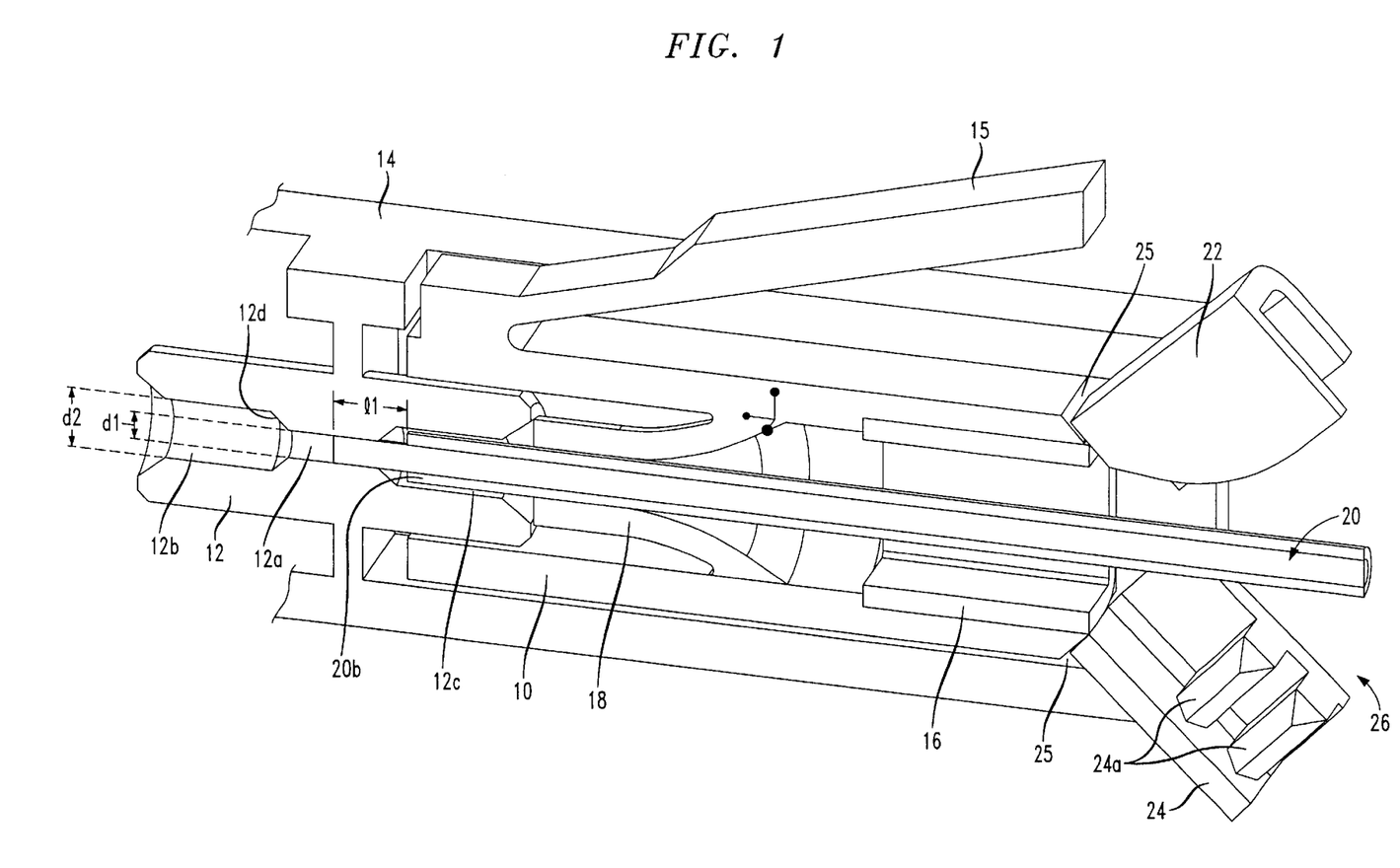
FIG. 1 is a cross-sectional elevated perspective view of a connector for a plastic optical fiber according to an embodiment of the present invention.
Figure 2:
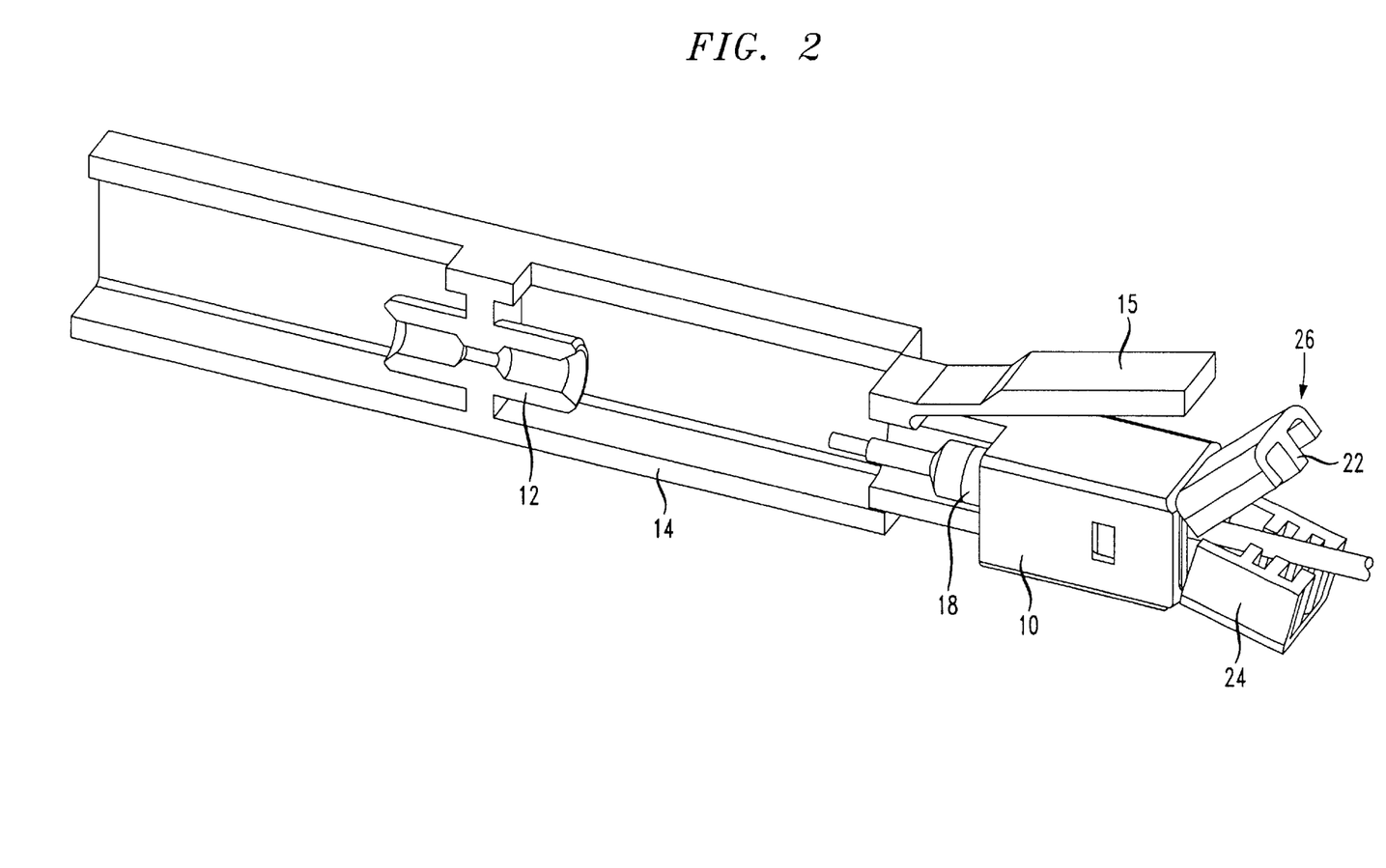
FIG. 2 is a partial cross-sectional view of a connector of FIG. 1 prior to insertion into a coupler.
Figure 3:
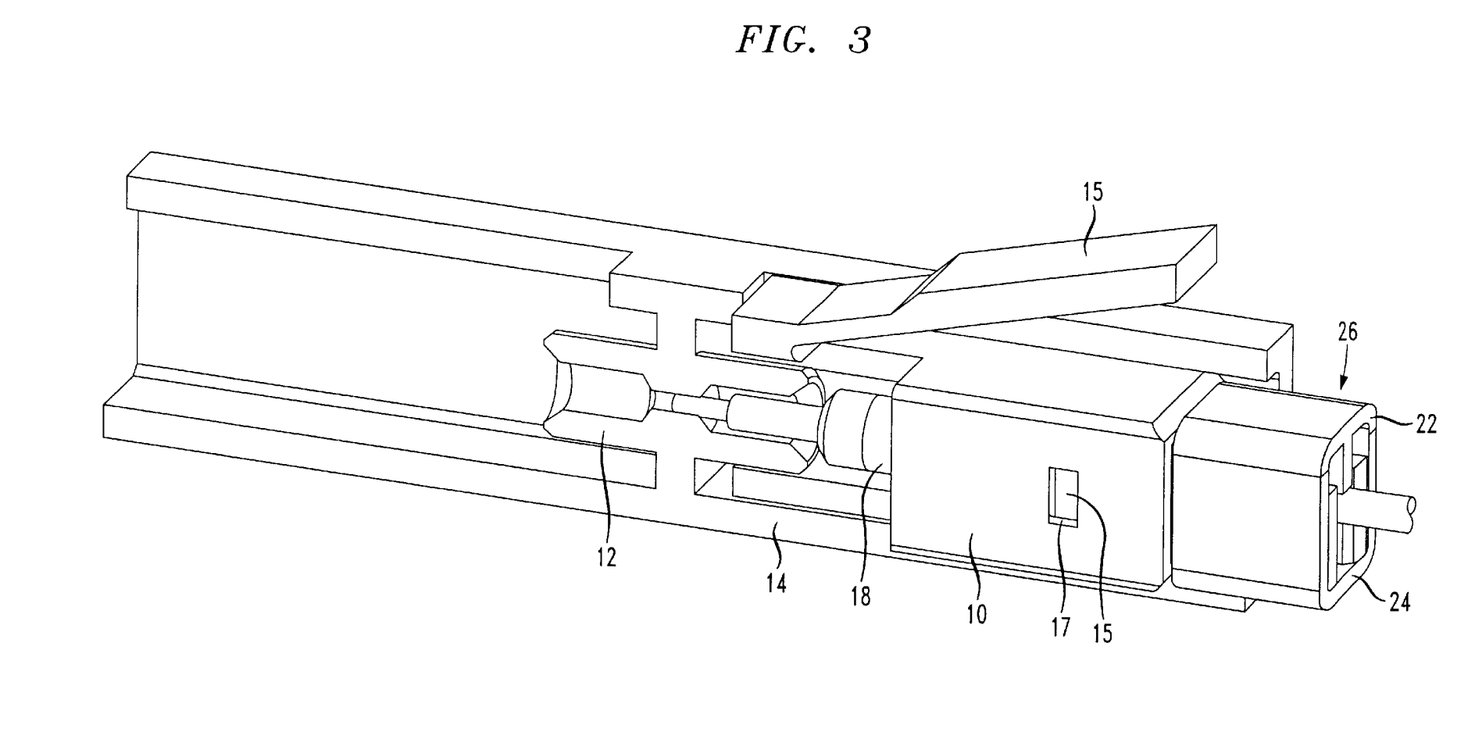
FIG. 3 is a partial cross-sectional view of the connector of FIG. 1 fully inserted into the coupler of FIG. 2.

A connector 10 for connecting optical fibers according to a first embodiment of the invention is shown in FIGS. 1, 2, and 3. The connector 10 is insertable into a coupler 14 for coupling a plastic optical fiber (POF) 20 in the connector 10 to another optical fiber held in another connector inserted in the opposing end of the coupler. The coupler 14 includes a sleeve 12 defining a through hole or bore having a central portion 12a with a first diameter d1 and two outer portions 12b, 12c with second diameters d2. The POF 20 comprises an optical fiber 20a and a fiber jacket 20b which is held in the connector 10. The connector 10 and optical fiber cable 20 are insertable as an assembly into the coupler 14 such that the end of the optical fiber 20a is inserted in the sleeve 12. A lever 15 on the connector 10 is used to hold the connector 10 in the coupler 14. The mechanism for holding the connector 10 in the coupler 14 via the lever 15 is known and is not shown for sake of clarity.

The optical fiber 20a without fiber jacket 20b fits into the central through hole portion 12a of sleeve 12, and the optical fiber 20a covered with fiber jacket 20b fits in the outer portions 12b, 12c. A second optical fiber and connector are insertable in the opposing side of the coupler 14 such that the two ends of the optical fibers are optically connected in the sleeve 12.

The connector 10 also includes a positioning guide 18 for frictionally holding the POF 20 in place in connector 10. POF 20 is inserted into the end of connector 10 on the right side as shown in FIG. 1 and the positioning guide 18 extends in angled relation in the insertion direction of POF 20. This arrangement facilitates ease of insertion of POF 20 while simultaneously positioning the POF 20 in alignment to engage the sleeve 12. A clamp 26 comprising a first clamping member 22 and a second clamping member 24 is formed with a base part 16. The first clamping member 22 and second clamping member 24a are connected to the base part 16 via living hinges 23, 25, i.e., via very thin, flexible or bendable portions. The base part 16 is a separate piece from the connector 10 and may be held in place in the connector 10 via the engagement of a projection 15 on the base part 16 and apertures 17 on the connector 10 as shown in FIGS. 2 and 3. The clamp 26 maintains the POF 20 in a specific position relative to connector 10. In the embodiment shown in FIGS. 1–3, the second clamping member 24 includes opposing fiber holding projections 24a. Only the fiber holding projections 24a on the far side of the fiber cable 20 are shown in FIG. 1. The bottom of first clamping member 22 may operate as a fiber pusher that urges the fiber cable 20 between the edges of the opposing fiber holding projections 24a so that the jacket 20b of the POF 20 is fixedly held by the fiber holding edges 24a when clamp 26 is in its closed position. The fiber holders 24a are designed to hold the fiber jacket 20b by biting or cutting a groove through an outer portion of the fiber jacket.

The process of assembling a connector 10 with an optical fiber cable 20 in the field includes the step of removing a length 11 of the fiber jacket 20b from the end of the POF 20. The length 11 of bare optical fiber 20a must be sufficient so that the bare optical fiber 20a adequately penetrates the central portion 12a of sleeve 12 for interconnection with another bare optical fiber in the coupler 14. As the optical fiber cable 20 is inserted in the connector 10, the cable 20 is held in place by the positioning guide 18. With cable 20 properly positioned, clamp 26 is closed to retain cable 20 in the connector. With the cable 20 properly held in connector 10 and the bare optical fiber 20a cut to a proper length, the connector 10 is inserted into the coupler 14 for connection to another optical fiber.

As the cable enters the coupler 14, the large diameter outer portion of the sleeve 12 provides a coarse alignment of the cable and the bare optical fiber 20a is finely aligned in the central through hole portion 12a of the sleeve 12. This arrangement of coarse alignment via the jacket 20b and fine alignment via the bare optical fiber 20a results in less wear on the cable 20, thereby enabling repeated use.

FIGS. 2 and 3 respectively show the connector 10 prior to insertion and after insertion into the coupler 14. The mechanism for holding the connector 10 in the coupler 14 via the lever 15 is known and is not shown for the sake of clarity. The opposing side of the coupler 14 (left side in FIGS. 1–3) is symmetrical with the side in which the connector 10 is inserted (right side in FIGS. 1–3). Accordingly, another connector 10 is insertable in this opposing side of the coupler 14 such that two optical fibers in the connectors may be optically connected within the sleeve 12 of the coupler 14. Alternatively, the coupler 14 may be integrated with an optical device. The optical device may, for example, comprise an opto-electronic transducer for transforming optical signals and electrical signals, or an element that alters optical signals such as an amplifier, polarizer, attenuator, or other device that receives an optical input signal, performs an operation on the signal, and outputs an optical output signal.

Figure 4:
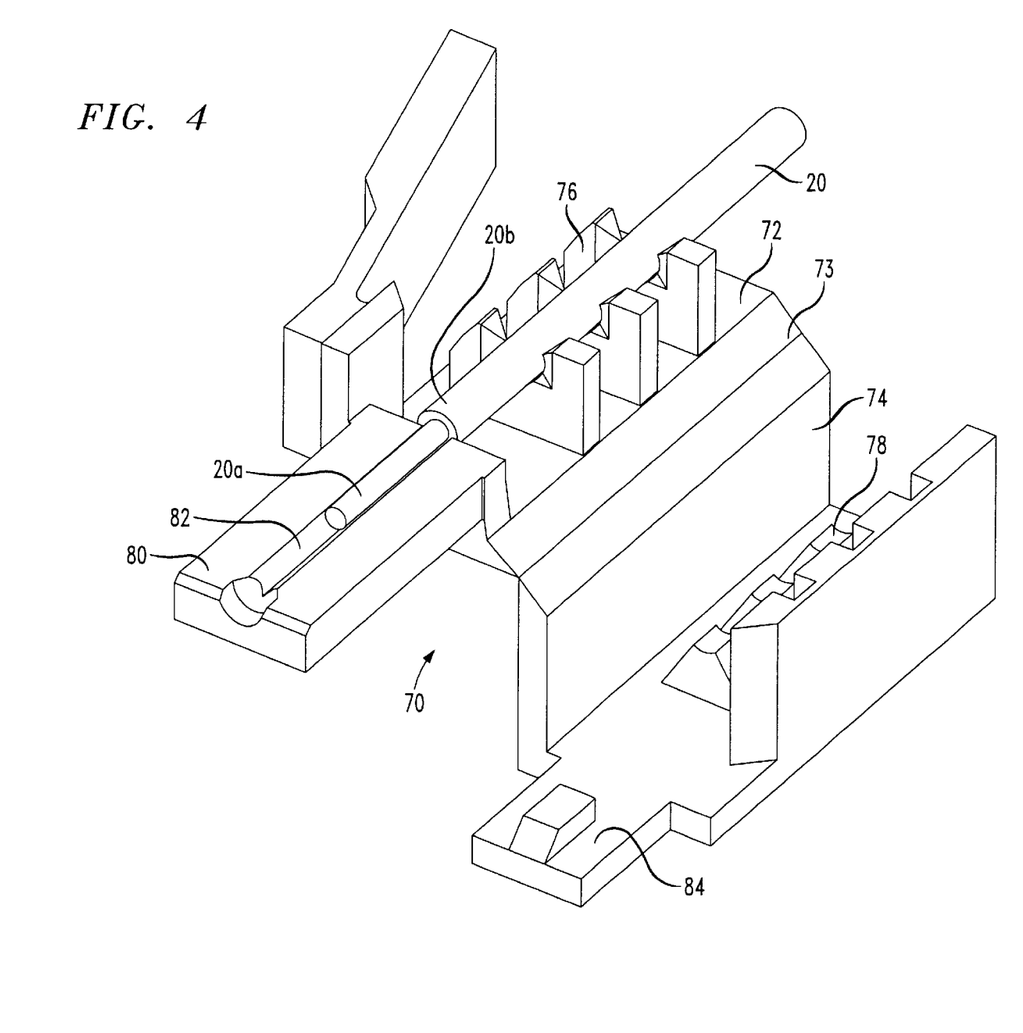
FIG. 4 is an elevated perspective view of a connector for a plastic optical fiber according to another embodiment of the present invention.

Another embodiment of a connector 70, formed of a first part 72 and a second part 74, is shown in FIG. 4. The parts 72, 74 are attached by a living hinge 73 which enables the connector 70 to be easily formed by molding and closed for use. In the open state depicted in FIG. 4, the optical fiber cable 20 is readily insertable into the interior of the connector 70. As in the first connector embodiment, a length 11 of the fiber jacket is removed from the end of cable 20. Instead of a fiber guide, connector 70 includes a V-groove element 80 defining a longitudinal V-groove 82 extending outwardly from a front face of the first part 72 of connector 70. The bare optical fiber 20a is positioned in the V-groove and the jacketed cable is placed in cable holders 76 arranged on first part 72. The second part 74 is then pivoted about living hinge 73 until closing elements 78 respectively aligned with holder 76 abut the holder 76 to press the cable 20 such therebetween so that the cable 20 is retained in position by the tapered edges of cable holders 76 and against relative movement within connector 70.

Although three sets of cable holders 76 and closing elements 78 are shown in FIG. 4, any number of sets of these elements may be provided as a general matter of design choice and to suit particular applications and implementations. Alternatively, or in addition, connector 70 may incorporate the positioning guide 18 and clamping element 26 of the connector embodiment of FIG. 1.

Figure 5A:
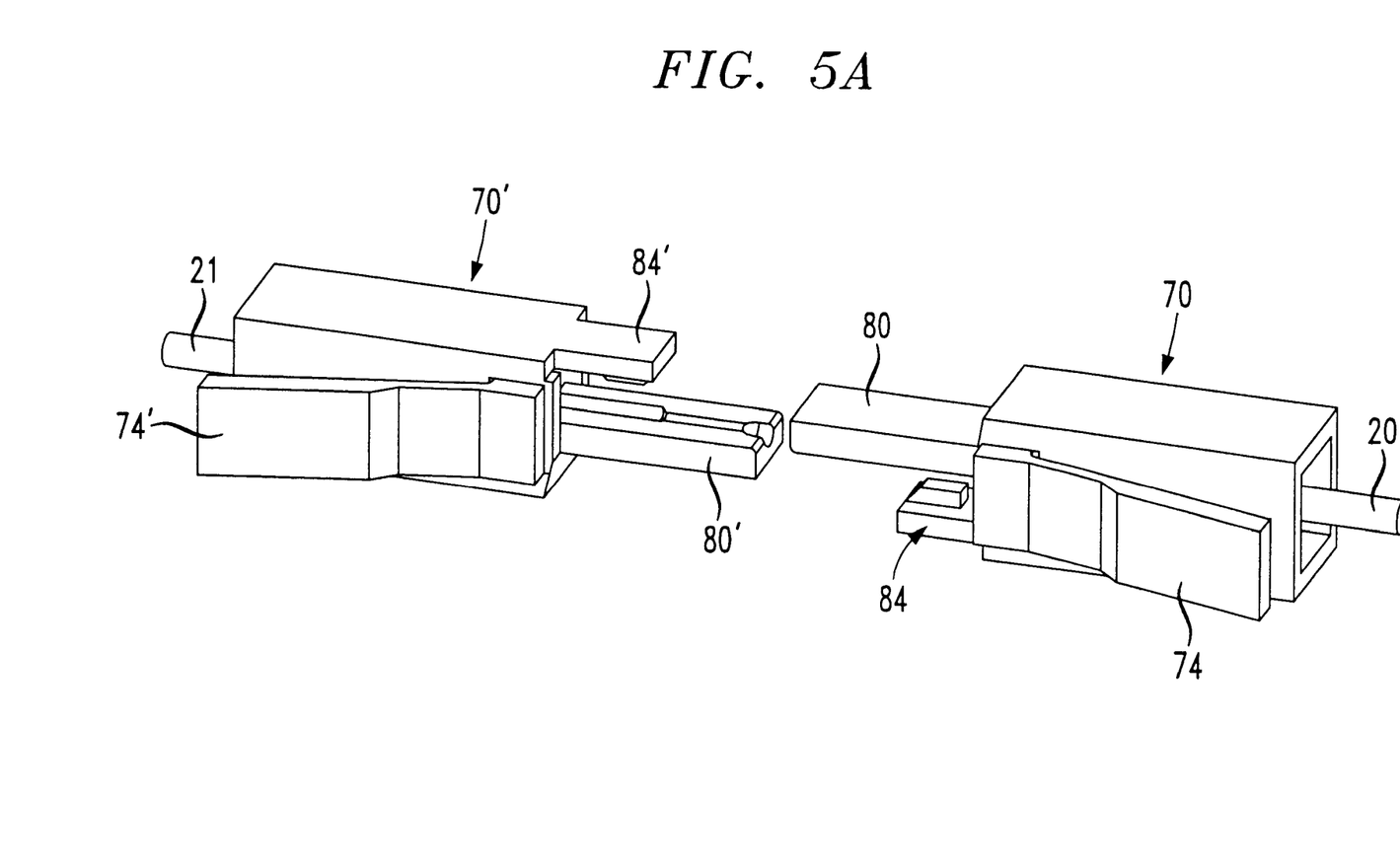
FIGS. 5a & 5b show to of the connectors of FIG. 4 in the disconnected state and in the connected state, respectively.
Figure 5B:
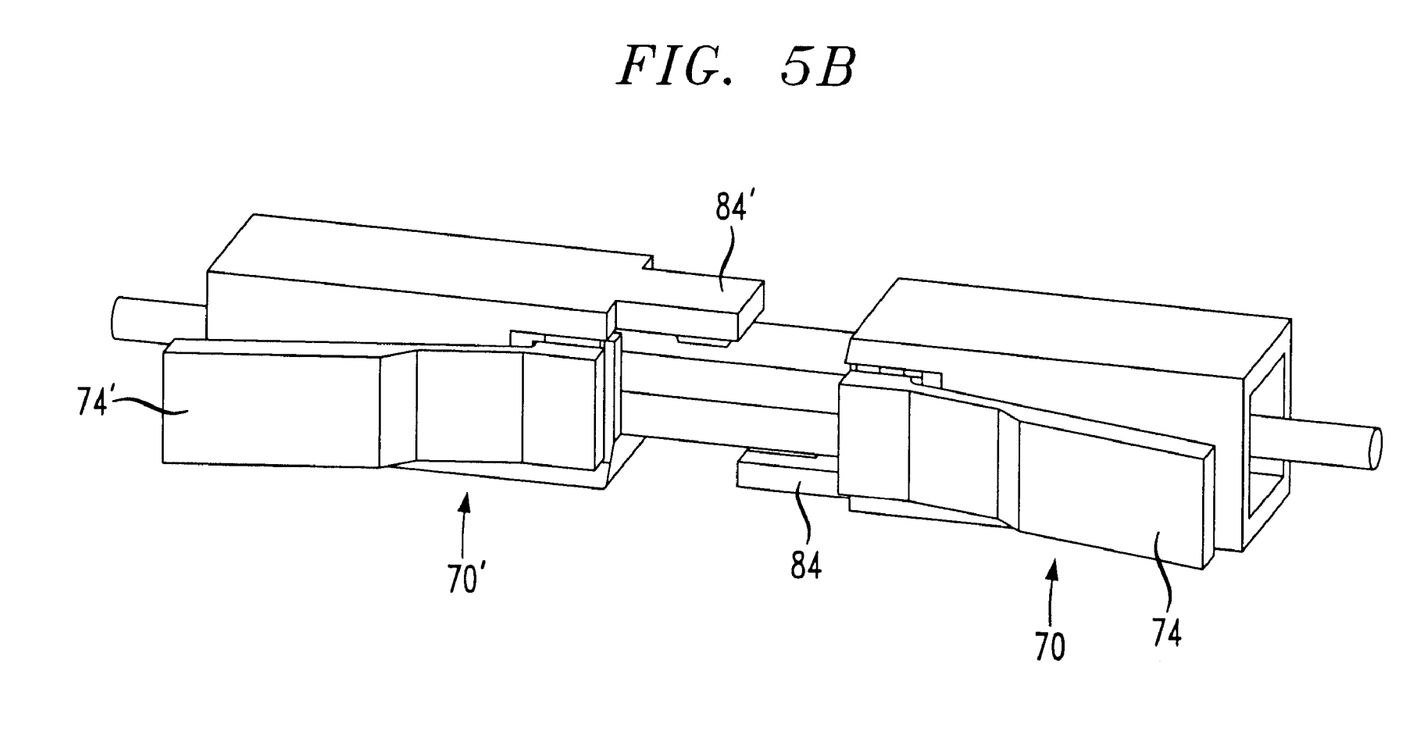

Connector 70 may be used as a connector to join or interconnect the end of one cable 20 to the end of another cable 21 attached or held by a similar connector 70', as, for example shown in FIGS. 5a and 5b. Each connector 70, 70' additionally includes a clamping spring element 84, 84' that extends outwardly from the front (or connecting end) of the respective connector in opposition to the V-groove of the corresponding V-groove element 80, 80'. To interconnect to two connectors 70, 70' and thereby, the respective optical cables 20, 21, the V-groove element 80 of connector 70 is inserted between the V-groove element 80' and the clamping spring element 84' of the other connector 70, and vice-versa. Each clamping element provides a resilient force for urging the opposed (same connector) V-groove element against the V-groove element of the other connector.

Figure 5C:
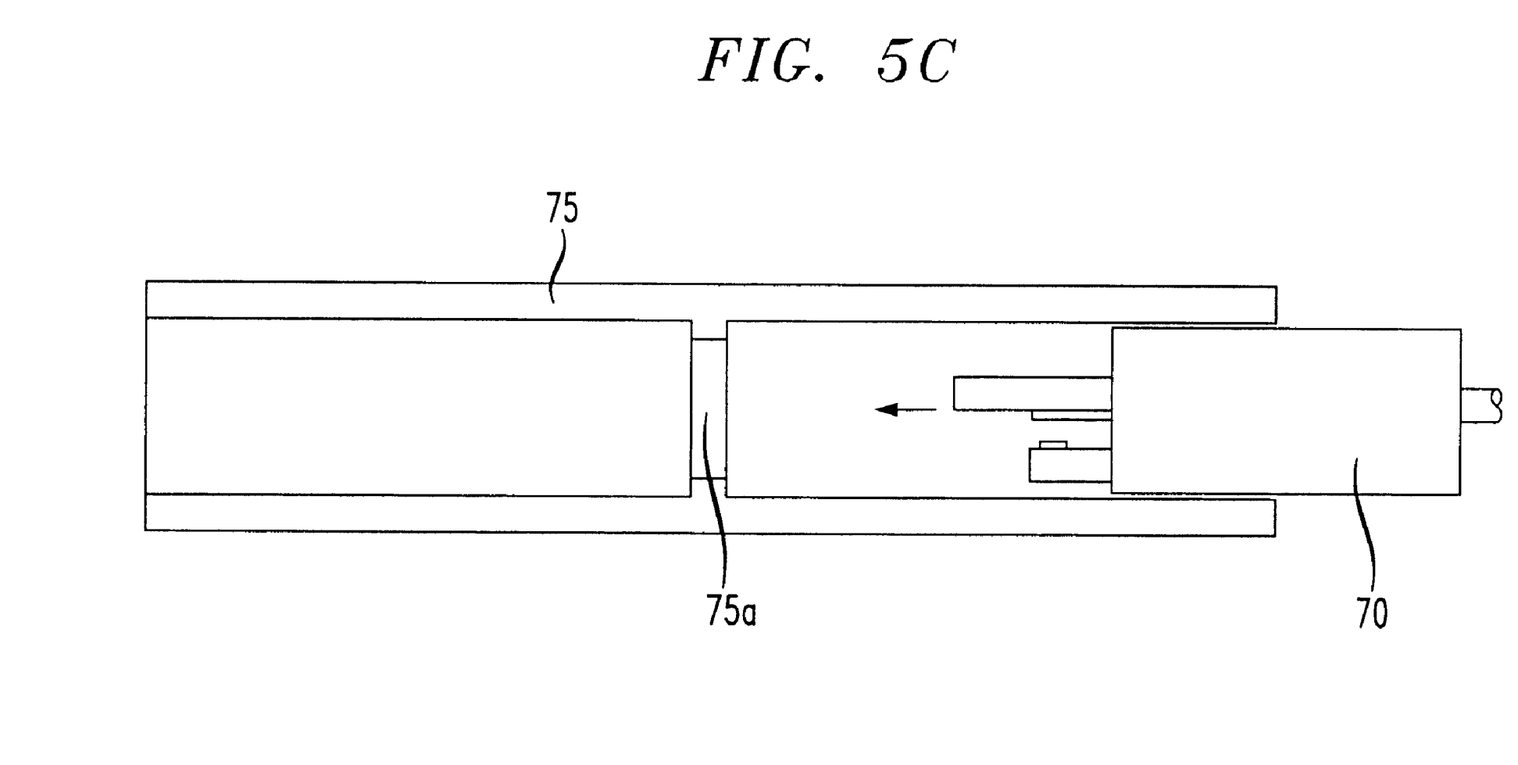
FIG. 5c shows partial sectional view of a coupler with a connector depicted in FIG. 4 inserted into the coupler.

Referring to FIG. 5c, the connector 70 is insertable in a coupler 75 similar to the coupler 14 shown in FIGS. 1–3. However, instead of a sleeve 12, the coupler 75 includes a rectangular through-hole for receiving the V-groove elements 80, 80' and clamping spring elements 84, 84'. The known retention of the connectors 70 in the coupler 75 via levers 74 and 74' is not shown for sake of clarity.

Figure 6:
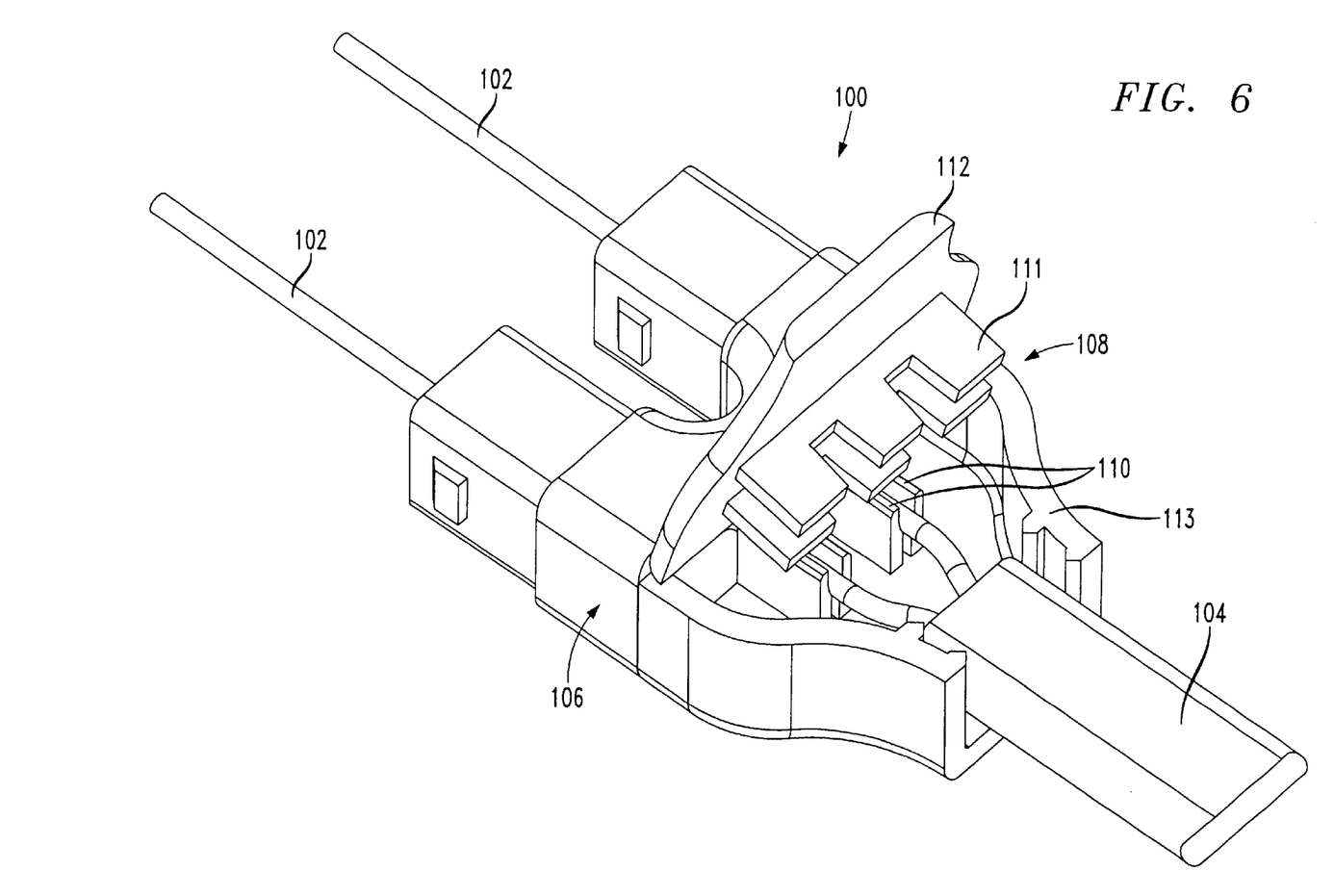
FIG. 6 is an elevated perspective view of a connector subassembly for a duplex plastic optical fiber cable according to yet another embodiment of the present invention.
Figure 7:
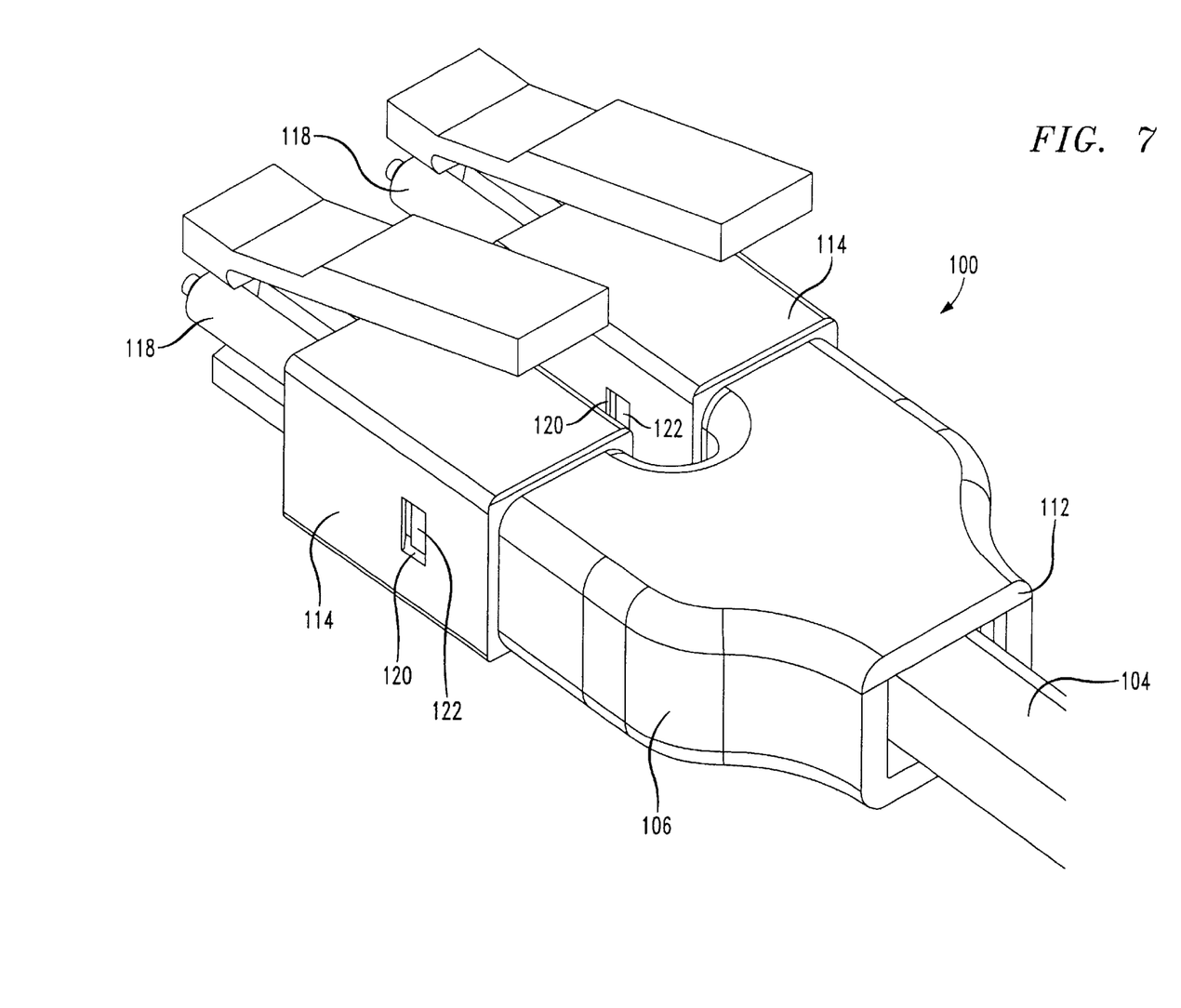
FIG. 7 is an elevated perspective view of the connector of FIG. 6 in the closed state and with connector housing.

FIGS. 6 and 7 show yet another embodiment of the invention, in this case a duplex connector 100 for accommodating a two fiber duplex optical cable 104. The duplex connector 100 includes a gripper 106 that receives the two optical fibers 102 of the duplex cable 104. A fiber clamp 108 having an upper cover 112 and a lower cover 113 is connected to the gripper 106. Each of the upper and lower covers 112, 113 is connected to the gripper 106 via a living hinge. The upper cover 112 is shown in its open position and the lower cover 113 is shown in its closed position. The lower cover opens away from the upper cover 112. Alternatively, the bottom cover may be formed in a fixed position with the gripper 106. However, the preferred embodiment includes both the upper and lower covers 112, 113 attached via living hinges. The lower cover 113 of fiber clamp 108 defines a pair of opposed, substantially parallel clamp walls 110 for holding each fiber therebetween and the upper cover 112 includes a clamp member 111 defining slots for urging the opposed clamp walls 110 together to clamp the fibers 102 between the opposed clamp walls when lid 112 is closed.

In the embodiment shown in FIGS. 6 and 7, the fibers 102 are bare optical fibers which pass through the gripper 106—i.e. there is no fiber jacket on the fiber. Therefore, the clamps walls 110 are used which apply pressure to a length of the fiber instead of the clamps 26 as shown above which apply pressure using sharp points to deform and grip the fiber jacket. Alternatively, clamp 108 may comprise elements similar to clamp 26 of the FIG. 1 embodiment or to the cable holders 76 and closing elements 78 of the embodiment of FIG. 4 if fibers with jackets are passed through the gripper. Once the fibers are placed in the gripper 106 and the upper and lower covers 112, 113 are closed, a cutting tool (not shown) may be used to cut the fibers to a proper length.

After completion of fiber cutting, as shown in FIG. 7, connector housings 114 are placed on the ends of gripper 106. The connector housings 114 each include a positioning guide 118 that is similar to the positioning guide 18 of FIGS. 1–3. In this embodiment, the positioning guide 118 extends further out of the connector housing such that the positioning guide 118 is insertable into a sleeve for coarse alignment of the fibers in the sleeve 12 of a coupler 14. Therefore, in this embodiment the positioning guides performs the function of the cable jacket 20b in the embodiment of FIGS. 1–3. The connector housings 114 may include apertures 120 that receive projections 122 on grippers 106 for retaining the connector housings 114 on the gripper. The projections 122 and apertures 120 are similar to the projections 15 and apertures 17 which are used to connect the base part 16 to the connector 10 of FIG. 1. In fact, the connector housings 114 are analogous to the connector 10 in FIG. 1 and the gripper 106 is analogous to the base part 16. The connector housings shown in FIG. 7 are LC-style connector housings (similar to the connector 10 of FIG. 1); the housings 114 may nevertheless be otherwise configured or designed to fit any standard or non-standard socket, and may for example incorporate the FIG. 1 embodiment (as depicted in FIG. 7) or the V-groove element 80 of the embodiment of FIG. 4.

Prior art optical fiber connectors typically utilize a spring to ensure a proper interconnection between fibers. In the present invention, the ends of the optical fibers are not cemented in ferrules—rather, they are adjustably movable in a sleeve or V-groove. Accordingly, the resilience of the length of fiber between the end of the fiber and that portion that is clamped may be employed to ensure that the fiber makes and maintains a proper optical connection.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An optical fiber connector for retaining an end portion of an optical fiber cable having a bare optical fiber covered by an optical fiber jacket, said optical fiber connector being insertable in a coupler for optically interconnecting the retained optical fiber cable to one of another optical fiber cable and an optical waveguide held in another connector inserted in an opposing end of the coupler, said optical fiber connector comprising:

a connector housing having a first end for holding the optical fiber cable end portion and a second end through which the optical fiber cable enters the connector;

a fiber holder disposed in the connector housing and comprising an aligning region for aligning the optical fiber cable end portion at a central region of said connector; and a fiber clamp on said connector housing for retaining the optical fiber cable in said connector and configured for selective movement between a release position in which the optical fiber cable is insertable into and selectively positionable within the connector housing and a clamping position in which the optical fiber cable is clamped within the connector housing against movement of the optical fiber cable relative to the connector housing.

2. The optical fiber connector claim 1, wherein said fiber clamp comprises first and second parts pivotally arranged on said connector housing for pivotal movement toward and away from each other between said clamping and release positions.

3. The optical fiber connector of claim 2, wherein said first and second parts of said fiber clamp are configured and arranged for clamping the optical fiber between said first and second parts with the fiber clamp in said clamped position.

4. The optical fiber connector of claim 3, wherein said fiber holder comprises a guide piece connected at an inner wall of said connector housing and extending radially inward, said fiber holder defining a through-hole through which the optical fiber cable is insertable.

5. The optical fiber connector of claim 4, wherein said first part of said fiber clamp comprises a projection having an edge configured and arranged to press against the optical fiber jacket and thereby prevent movement of the optical fiber cable with said fiber clamp in said clamping position.

6. The optical fiber connector of claim 1, wherein said fiber clamp comprises a first portion carrying a pair of opposed wall members between which the bare optical fiber is receivable and a second portion pivotally movable relative to said first portion and defining a slot configured and arranged to press together said opposed wall members in said clamping position of the fiber clamp and thereby clamp the bare optical fiber between the opposed wall members.

7. The optical fiber connector of claim 1, wherein said fiber holder comprises a guide piece connected at an inner wall of said connector housing and extending radially inward, said fiber holder defining a through-hole through which the optical fiber cable is insertable.

8. The optical fiber connector of claim 7, wherein said guide piece extending radially inward is also angled relative to an insertion direction of the optical fiber cable.

9. The optical fiber connector of claim 1, wherein said connector housing comprises first and second housing parts, said first part being pivotally connected to said second part along a pivot axis.

10. The optical fiber connector of claim 9, wherein said fiber clamp comprises first and second clamping parts, said first clamping part being mounted on said first housing part and said second clamping part being mounted on said second housing part, said first and second housing parts being movable with said first and second clamping parts between said clamping position and said release position.

11. The optical fiber connector of claim 10, wherein said fiber holder further comprises a longitudinally extending V-groove element and wherein said aligning region comprises a V-groove for receiving the optical fiber cable end portion.

12. The optical fiber connector of claim 11, wherein said V-groove element is configured and arranged for engagement with a corresponding V-groove element of another connector holding an optical fiber cable for optically connecting the optical fiber cables.

13. The optical fiber connector of claim 1, wherein said fiber holder further comprises a longitudinally extending V-groove element and wherein said aligning region comprises a V-groove for receiving the optical fiber cable end portion.

14. The optical fiber connector of claim 13, wherein said V-groove element is configured and arranged for engagement with a corresponding V-groove element of another connector holding another optical fiber cable for optically connecting the two optical fibers.

15. The optical fiber connector of claim 1, wherein said connector housing comprises a first part comprising said fiber holder and a second part comprising said fiber clamp, said first part being fixedly connectable to said second part.

16. The optical fiber connector of claim 15, wherein said first part is connectable to said second part via a frictional connection defined in at least one of said first and second parts.

17. The optical fiber connector of claim 15, wherein said second part comprises a projection and said first part comprises an aperture for receiving the projection for connecting said second part to said first part.

18. The optical fiber connector of claim 1, wherein said fiber holder comprises first and second fiber holders for receiving respective first and second bare optical fibers of a duplex fiber optic cable.

19. The optical fiber connector of claim 18, wherein said first fiber holder defines a first connector housing said second fiber holder defines a second connector housing, and wherein said fiber clamp defines a gripper in said housing for gripping said first and second connector housings.

20. The optical fiber connector of claim 1, wherein said fiber holder and said fiber clamp are configured and arranged such that a resilience of the optical fiber cable inserted in said optical fiber connector between the end portion and said fiber clamp operatively ensures a proper optical connection between the optical fiber cable and one of another optical fiber cable and an optical waveguide held in the socket and another connector.

21. The optical fiber connector of claim 1, in combination with said coupler in which said optical fiber connector is insertable, wherein said coupler comprises a sleeve for receiving an end of the optical fiber cable retained in said optical fiber connector and one of another optical fiber cable and an optical waveguide held in another connector inserted in an opposing end of said coupler, said sleeve having a central portion with a first diameter and two outer portions surrounding said central portion with second diameters, said first diameter being smaller than said second diameter.

22. The combination of claim 21, wherein said second diameter is sized for receiving the optical fiber jacket of said optical fiber cable and said first diameter is sized for receiving the bare optical fiber of said optical fiber cable.

23. The combination of claim 21, wherein said sleeve further comprises a tapered section arranged between each one of said outer portions and said central portion of said sleeve.

* * * * *